United States Patent [19]
Yokota

[11] Patent Number: 6,059,345
[45] Date of Patent: May 9, 2000

[54] SLIDE RAIL DEVICE FOR VEHICLE SEAT

[75] Inventor: Masaaki Yokota, Akishima, Japan

[73] Assignee: Tachi-S Co., Ltd., Tokyo, Japan

[21] Appl. No.: 09/099,317

[22] Filed: Jun. 18, 1998

[51] Int. Cl.$^7$ ...................................................... B60N 2/02
[52] U.S. Cl. .................................. 296/65.14; 296/65.13; 297/331; 248/430
[58] Field of Search .............................. 296/65.13, 65.14, 296/65.15; 248/424, 419, 429, 430; 297/331, 335, 336

[56] References Cited

U.S. PATENT DOCUMENTS

| | | | |
|---|---|---|---|
| 4,262,963 | 4/1981 | Bauer et al. | 296/65.14 X |
| 5,234,189 | 8/1993 | Myers | 296/65.13 X |
| 5,711,505 | 1/1998 | Nemoto . | |
| 5,785,292 | 7/1998 | Muraishi et al. . | |

FOREIGN PATENT DOCUMENTS

| | | |
|---|---|---|
| 3248930 | 11/1991 | Japan . |
| 499137 | 8/1992 | Japan . |
| 4104027 | 9/1992 | Japan . |

*Primary Examiner*—Joseph D. Pape
*Attorney, Agent, or Firm*—Browdy and Neimark

[57] ABSTRACT

A slide rail device for a vehicle seat including a lower rail member fixed on a floor of the vehicle and an upper rail member slidably fitted in the lower rail member. Basically, a stopper and a notch are provided respectively at the forward and rearward ends of the upper rail member, while a striker is provided at the floor of the vehicle, erecting therefrom. When the upper rail member is located at a home position upon the lower rail member, the stopper is abutted against the forward end of the upper rail member and side of the floor, with the notch being engaged over the striker, whereby the upper rail member is prevented against separation from the lower rail member. Another striker and hook-like lock member may be provided in the case where the vehicle seat is of a jump-seat type having a seat belt anchor, so that not only the seat is locked to the upper rail member against forward jumping, but also an upwardly slant pulling force applied through the seat belt anchor is dispersed and escaped to the floor through the stopper, two strikers, the lock member and the notch. Further, a guide roller arrangement is provided at the upper rail member for supportive sliding in the lower member, which includes a guide piece at one of the guide rollers that will be exposed from the lower rail member when the upper rail member is slid away from the lower rail member, such that the exposed portion of the upper rail member can be withdrawn into the lower rail member, with guiding aid of the guide piece.

18 Claims, 4 Drawing Sheets

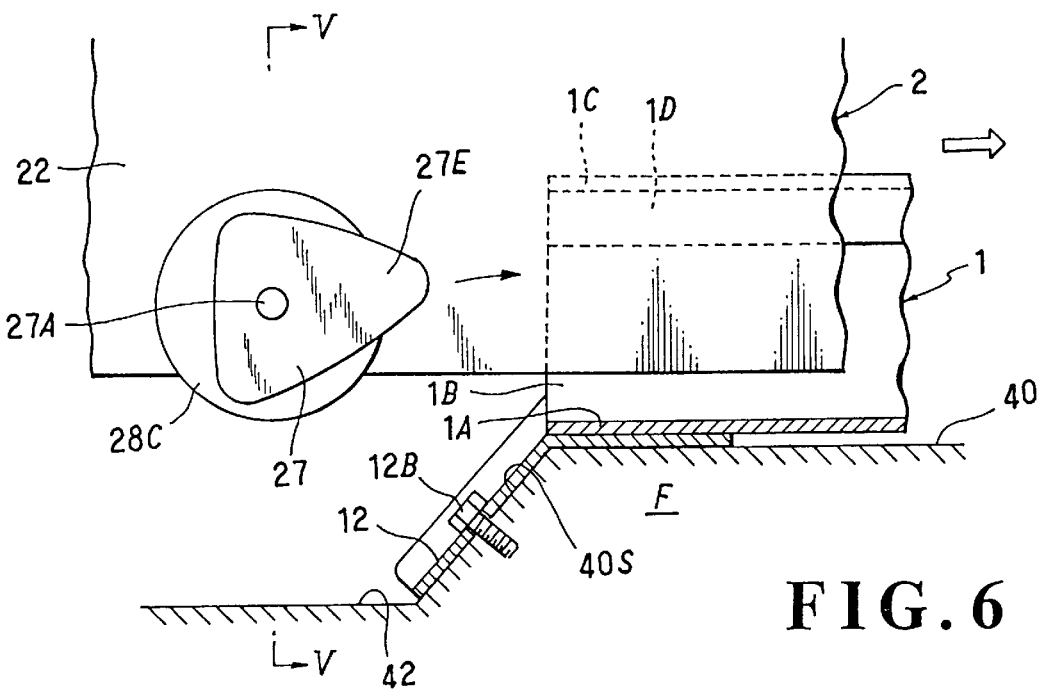
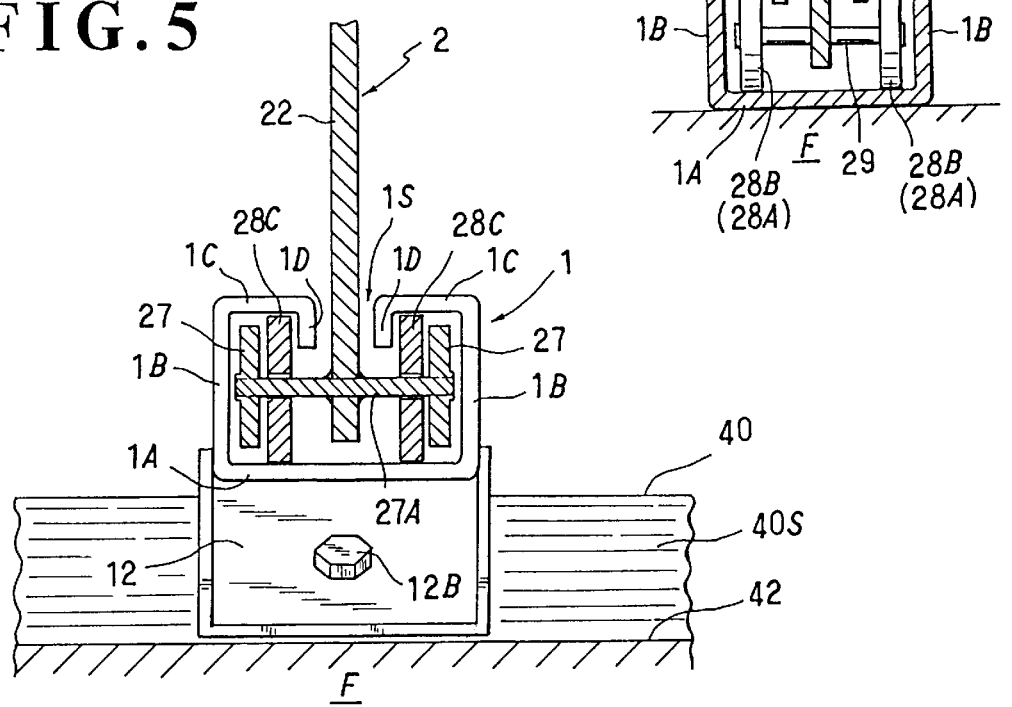

SLIDE RAIL DEVICE FOR VEHICLE SEAT

BACKGROUND OF INVENTION

1. Field of the Invention

The present invention generally relates to a slide rail device for use in a vehicle seat such an automotive seat, which is operable to adjust the seat in position in the fore-and-aft direction. More specifically, the invention is directed to the slide rail device of this kind for particular use in a foldable type of vehicle seat provided with a seat belt anchor.

2. Description of Prior Art

In general, a slide rail device is provided for adjustment of fore-and-aft position of a vehicle or automotive seat. In the case where the slide rail device is applied to a vehicle seat of the kind having a seat belt anchor for anchoring a seat belt which restrains the body of an occupant to the seat, a structural reinforcement is arranged in the slide rail device to resist a great pulling force applied from the occupant through the seat belt in a collision case or the like. As a typical conventional arrangement in this regard, either of the upper and lower rails of slide rail device may be increased in thickness, or a reinforcing element may be provided thereto, so as to prevent separation of the upper rail from the lower rail due to the foregoing great pulling force.

The slide rail device of this kind is also used in a second seat within the so-called "one-box car" or van-type automobile which normally has three sets of seats disposed therein; i.e. a front seat, a second seat and third seat. The second seat is therefore of the foldable type that allows its seat back to be folded onto its seat cushion and further allows the whole seat to be jumped or turned via a hinge in the forward direction to an inverted upright state, so that an increased space may be attained in the cabin, as a load carrying area for example. As known in the art, the slide rail device comprises a lower rail member fixed on a floor of vehicle or automobile, and an upper rail member slidably fitted in the lower rail member, on which upper rail member, the seat is mounted. In particular, rollers are provided between the lower and upper rail members to improve the slidability of the upper rail member along the lower rail member, and the rollers are normally composed of a forward set of rollers disposed forwardly of the slide rail device and a rearward set of rollers disposed rearwardly of the same.

These hitherto structures of slide rail device, however, have been found defective in that its weight is increased and the number of associated fittings and parts are also increased, with a complicated designs incidental therewith, hence requiring a number of additional assembling steps and man hours. Further, when the upper rail member are slid forwards and projected from the lower rail member, the forward set of rollers are exposed away from the lower rail member, in which case, the projected portion of upper rail member are fallen in contact with the bottom of lower rail member, interfering with the smooth forward sliding of the upper rail member along the lower rail member. This contact also interferes with backward sliding of the upper rail member. In that case, the exposed rollers collide with the forward edges of lower rail member, which prevents further backward sliding of upper rail member, with the result that the upper rail member can hardly be slid back to a home position upon the lower rail member.

SUMMARY OF THE INVENTION

With the above-stated drawbacks in view, it is a primary purpose of the present invention to provide an improved slide rail device for vehicle seat which is simplified and robust in structure, sufficient to prevent separation of an upper rail member from a lower rail member.

To achieve such purpose, in accordance with the present invention, there is basically provided a slide rail device in combination with a vehicle seat having a seat cushion and a floor of vehicle, which comprises:

a lower rail means to be fixed on the floor of vehicle;

an upper rail means slidably fitted in and along the lower rail means, on which upper rail means, the seat cushion of vehicle seat is to be mounted, the upper rail means being slidable on the lower rail means between a home position where the upper rail means is normally placed in position relative to the lower rail means and an advanced position where the upper rail means is slid in a direction away from the lower rail means and located;

a separation preventive means for preventing the upper rail means against separation from the lower rail means, the separation preventive means including:

a striker means erecting fast from the floor of vehicle;

a notch means defined in one end portion of the upper rail means, the notch means being adapted for engagement with the striker means when the upper rail means is located at the home position; and a stopper means provided on another end portion of the upper rail means opposite to the foregoing one end portion of the same upper rail means, with such an arrangement that the stopper means is to be abutted against an end of the lower rail means and the side of floor of vehicle, when the upper rail means is located at the home position.

Accordingly, in accordance with the invention, all the above-described striker means, notch means and stopper means are easily and directly applicable to a known structure of the upper and lower rail means, without structural changes of those two rail means for reinforcement, such as by increasing their thicknesses. Thus, the whole two rail means may be reduced in weight, while effectively preventing separation of them from each other. In a collision case or the like, an upwardly slant pulling force applied from an occupant on the seat is effectively escaped and dispersed to the floor through the engagement between the striker and notch means and the abutment of stopper means against the floor and end of lower rail means, thereby protecting the upper rail means against separation from the lower rail means as well as against damage and deformation.

The present invention may be applied to such jump-seat-type vehicle seat having a seat belt anchor on its seat cushion, with a lock mechanism provided between the upper and lower rail means, wherein the seat back is connected via a hinge means with the upper rail member to permit jumping of the vehicle seat relative to the hinge means from the upper rail member to an inverted upright position. In that case, the separation preventive means may further comprise: another striker means provided at the upper rail means adjacent to the notch means; and a hook-like engagement means arranged at the seat cushion such as to be engageable with the foregoing another striker means, so that when the hook-like engagement means is engaged with that another striker means, the upper rail means is not only prevented against separation from the lower rail means, but also locked against the jumping of vehicle seat. In this regard, in a collision case for example, dynamically, an upwardly slant great pulling force is generated from an occupant on the seat and transmitted via both seat belt and seat belt anchor to the hook-like engagement means, such that an upward vertical component force of that pulling force is dispersed to the floor through one transmission path established by the foregoing another striker means and hook-like engagement means, and to another transmission path established by the notch and one striker means, and that a forward horizontal component force of the pulling force is dispersed to the upper and lower rail means via the engagement between the hook-like engagement means and another striker means as well as the lock mechanism.

Moreover, in accordance with the invention, a guide roller arrangement is provided at the lower rail means, which comprises a first guide roller means, an intermediate guide roller means and a second guide roller means, such that the second and intermediate guide roller means are distant from each other to the smallest possible degree at which they can support and keep the aforementioned another end portion of upper rail means out of contact with the lower rail means when the upper rail means is located at the advanced position, with that particular another end portion thereof and the first guide roller means being both exposed externally of the lower rail means.

It is a second purpose of the present invention to facilitate the ease of withdrawing the upper rail means into the lower rail means.

For that purpose, the afore-stated guide roller arrangement further comprises a guide piece fixed to a pin on which the first guide roller means is rotatably supported, the guide piece being of a shape having a tapered end area oriented in a direction inwardly of the lower rail means, so that, when the upper rail means is withdrawn from the advanced position, where a portion of the first guide roller means is exposed externally of the lower rail means, towards the home position, such tapered end area of the guide piece are smoothly introduced into the lower rail means, thereby assisting in smooth entry of the first guide roller means into the lower rail means.

BRIEF DESCRIPTION OF THE DRAWINGS

FIG. 4 is a partly broken fragmentary view of the slide rail device, which shows a triangular guide piece;

FIG. 5 is a schematic sectional view taken along the line V—V in FIG. 4, showing a forward guide roller and the triangular guide piece; and FIG. 6 is a schematic cross-sectional view of the slide rail device, showing intermediate and rearward guide rollers.

DETAILED DESCRIPTION OF PREFERRED EMBODIMENT OF THE INVENTION

Referring to FIGS. 1 through 5, there is illustrated one exemplary embodiment of slide rail device in accordance with the present invention, which is applied to a jump-seat-type foldable vehicle or automotive seat as a combination relation therewith.

As shown by way of example in the figures, the slide rail device is generally designated by (SLD), whereas the automotive seat used in combination therewith is generally designated by (S). Insofar as shown in the present mode, the seat (S) is provided with a seat belt anchor (33) for lockable receipt of a buckle of seat belt (B) that serves to restrain the body of an occupant to the seat, and may be of known foldable type such that the seat back (SB) is foldable onto the seat cushion (SC). It should be understood that the slide rail device (SLD), as normally known in the art, assumes a pair of spaced-apart slide rails disposed underneath the seat cushion (SC) to support the seat (S) stable, and for the sake of simplicity, description and figures will only refer to one slide rail (i.e. the combination of upper and lower rail members (2)(1) as will be described), hereinafter.

Figure 1:
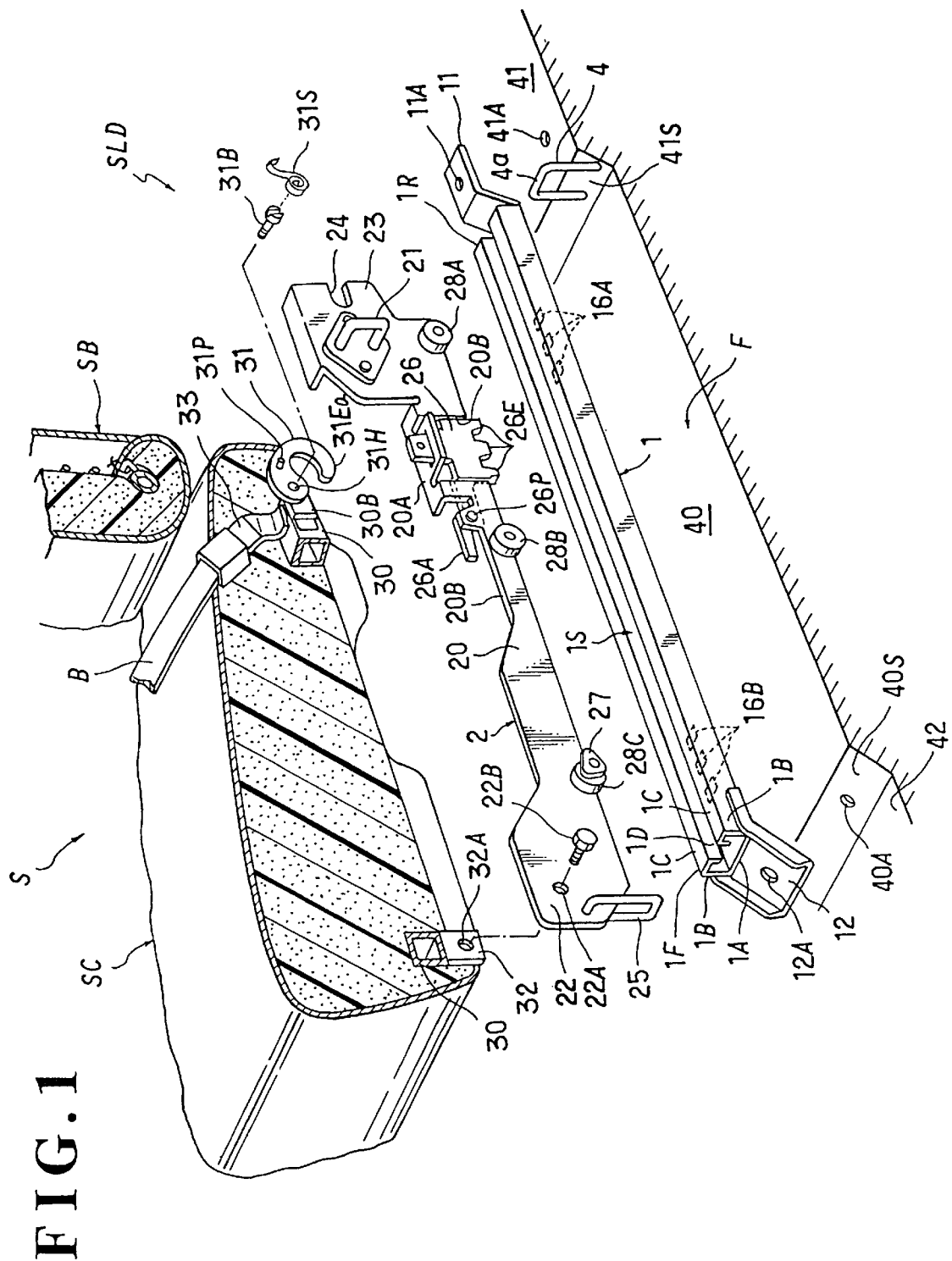
FIG. 1 is a partly broken, exploded perspective view of a slide rail device in accordance with the present invention.
Figure 2:
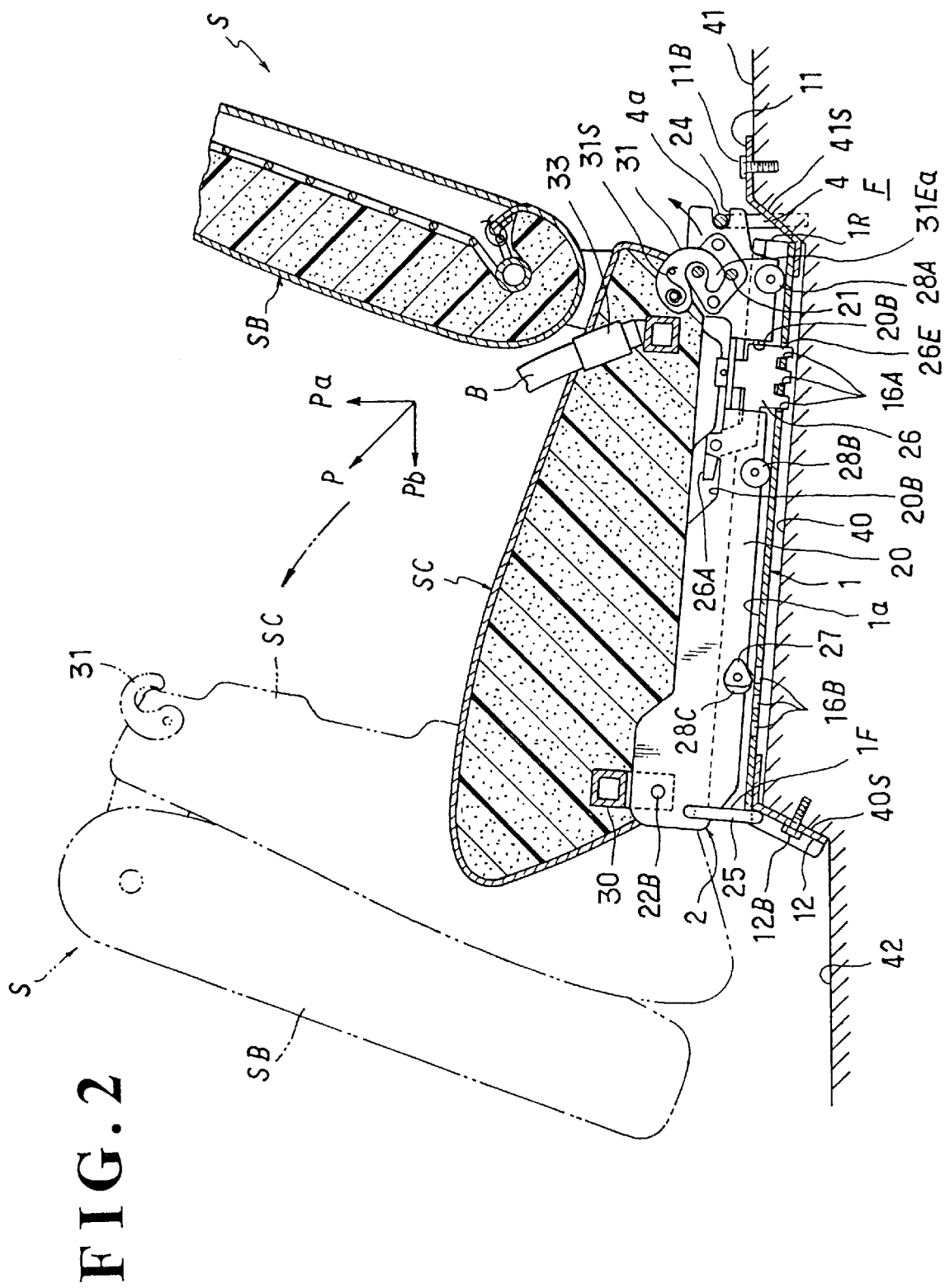
FIG. 2 is a sectional view of the slide rail device, which shows a normal locked state of the slide rail device.

The seat (S), as seen in FIG. 1, has a base frame (30) provided in the bottom thereof. Base frame (30) is further provided integrally with a hinge bracket (32) at the forward frame section thereof and with a seat belt anchor (33) at the backward frame section thereof. Thus, the seat (S) may be jumped or turned forwardly relative to the hinge bracket (32) as seen in FIG. 2. This forward jumping of seat (S) is normally prohibited by a hook-like rotary lock member (31) provided at the seat cushion. As will be described later, the hook-like rotary lock member (31) also serves to impart a great pulling force (at P in FIG. 2) applied from the seat belt (B), to a floor (F), as one constitute element of a separation preventive means noted below. This lock member (31) is formed from a rigid metallic material in a generally hook shape having a base end portion (31Eb) and a free lock end portion (31Ea). The base end portion (31Eb) is rotatably connected via pin (31B) to a support bracket (30B) fixed at the rearward frame section of base frame (30) of seat back (SB), with a spiral spring (31S) connected between the pin (31B) and a projection (31P) of lock member (31). Thus, the lock member (31) is biased by the spiral spring (31S) such that the free lock end portion (31Ea) thereof is normally engaged over a U-shaped first striker (21) fixed on the rearward widened area (23) of upper rail member (2), thereby normally locking the seat (S) against the above-described forward jumping.

Basically, the slide rail device (SLD) in accordance with the present invention is comprised of: a stationary lower rail member (1); a movable upper rail member (2) with novel guide roller arrangement (28A, 28B, 28C, 27); a fore-and-aft locking mechanism (26, 16A, 16B); and a separation preventive means (4, 21, 24, 25 and 31) for preventing the upper rail member (2) against separation from the lower rail member (1) due to a great pulling force (P, Pa and Pb in FIG. 2) applied via the seat belt anchor (31) and seat belt (B) from an occupant sitting on the seat (S) in a collision case or the like.

The stationary lower rail member (1) is best shown in FIG. 1 as being formed to have a known channel cross-section, such as to constitute a flat bottom wall (1A), a pair of lateral walls (1B)(1B) erecting continuously from the respective sides of that bottom wall (1A), a pair of spaced-apart top walls (1C)(1C) each extending continuously from the respective pair of lateral walls (1B)(1B) in a mutually faced and spaced relation, a pair of guide flanges (1D)(1D) dependent fast from the respective edges of the two top walls (1C)(1C), and a longitudinal guide slit (1S) defined between and along the guide flanges (1D)(1D). With such configuration, a pair of spaced-apart longitudinal guide passages are formed in the lower rail member (1), each of which is therefore defined by the bottom wall (1A), lateral wall (1B), top wall (1C) as well as the guide flange (1D). Hence, as will be specified, the guide roller arrangement (27, 28A, 28B, 28C) is accommodated in such longitudinal guide passages to support the upper rail member (2) in a fore-and-aft slidable manner relative to the lower rail member (1). In the bottom wall (1A) of this lower rail member (1), one set of three lock holes (16A) and another set of three lock holes (16B) are formed, which are one constituent element of the locking mechanism stated above (at 26). Designations (1F) and (1R) denote forward and rearward ends of this lower rail member (1), respectively. It is to be understood that the forward end (1F) faces toward the forward direction of a vehicle or automobile (not shown), while the rearward end (1R) faces toward the rearward direction of the same.

Fixed respectively to the forward and rearward ends (1F)(1R) of this lower rail member (1) are a forward leg member (12) of a generally inverted "V" shape having a securing hole (12A) formed in the inclined part thereof and a backward leg member (11) of a generally offset configuration having a securing hole (11A) formed in the upper horizontal part thereof. Those two leg members (12)(11) are provided for firm connection of the lower rail member (1) upon the uneven stepped floor (F) of vehicle or automobile, using their respective fastening bolts (12B)(11B), as far as the present illustrated embodiment is concerned. As seen from FIG. 1, the floor (F) includes an upper flat floor stage (41) where a second or third seat may be located, or a load carrying platform may be defined, a downwardly stepped intermediate floor section (40) and a lowest stepped floor section (42). The lower rail member (1) is mounted on the intermediate floor section (40). The stepped floor (F) includes two sloped transition regions (41S)(40S). Thus, as understandable in FIGS. 1 and 2, the forward leg member (12) is placed fit over the angled area between one sloped transition region (40S) and the intermediate floor section (40), while on the other hand, the rearward leg member (11) is placed fit over the angled area between another sloped transition region (41S) and the flat floor stage (41). Then, as the two securing holes (11A)(12A) are aligned with two threaded holes (41A)(40A), respectively, bolts (11B)(12B) are driven into one set of the thus-aligned holes (11A)(41A) and another set of the thus-aligned holes (12A)(40A), respectively, to thereby firmly fasten the whole lower rail member (1) to the floor section (40). This is however one exemplary fastening way of the lower rail member (1), and the floor (F) and leg members (11)(12) are not limited to the illustrated mode, but may be changed to such a mode wherein the floor (F) is a whole flat floor, with the leg members (11)(12) designed to be placed thereon.

The movable upper rail member (2) is of a known vertical plate-like rail type for slidable engagement in and along the longitudinal guide slit (1S) of lower rail member (1), and formed from a rigid plate material such as to define therein a forward height-wise widened area (22), an intermediate narrowed area (20) and a rearward height-wise widened area (23). This upper rail member (2) is of a length generally equal to that of the lower rail member (1) as can be seen from FIG. 2. A hinge hole (22A) is formed in the forward widened area (22), through which hinge hole, a hinge pin (22B) is driven and secured firm in a threaded hole (32) formed in the hinge bracket (32). Hence, the seat (S) is free to rotate about the hinge pin (22B) in the fore-and-aft direction, so that it may be set in a horizontal sitting position shown in the solid line in FIG. 2, or may be jumped forwardly to an inverted upright position indicated by the two-dot chain line of the same FIG. 2.

Figure 3:
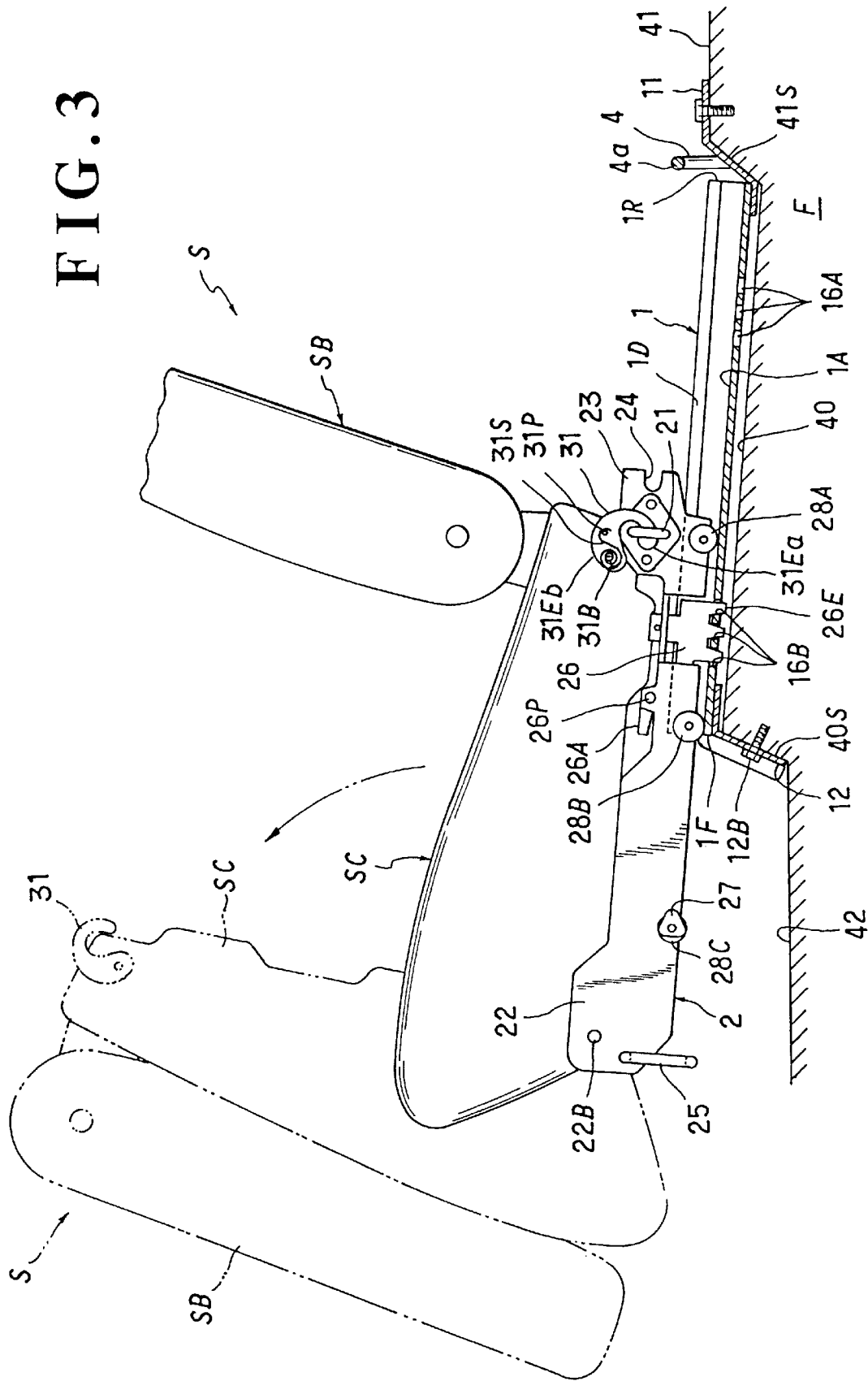
FIG. 3 is a sectional view of the slide rail device, which shows the state where an upper rail member is slid and locked at an advanced position relative to a lower rail member.

As is known, a fore-and-aft positional locking mechanism is provided to lock and unlock the upper rail member (2) relative to the lower rail member (1) at a selected one of a normal home position (see FIG. 2) and a forwardly advanced position (see FIG. 3). This locking mechanism itself is of a known type comprising a lock plate (26) having three lock teeth (26E) and two sets of forward and rearward three lock holes (16B) and (16A). The lock plate (26) is supported and slidable vertically in both angled support area (20A) and cut-away area (20B) of the upper rail member (2), adjacent to the rearward height-wise widened area (23) of the same upper rail member (2). This lock plate (26) is integrally connected with a control lever (26A) pivoted at (26P) of upper rail member (2), so that vertical operation of he control lever (26A) causes the lock plate (26) to displace vertically within the cut-away region (20B) of upper rail member (2), thereby engaging and disengaging the three lock teeth (26E) into and from either one set of forward three lock holes (16B) or another set of rearward three lock holes (16A). Although not shown, the control lever (26A) is operatively connected with a proper controller. As already noted above, the lock holes (16B)(16A) are formed in the bottom wall (1A) of lower rail member (1). In other words, one set of forward three lock holes (16B) defines a forward lock position where the upper rail member (2) may be locked in the forwardly advanced position shown in FIG. 3 relative to the lower rail member (1), whereas another set of rearward three lock holes (16A) defines a home lock position where the upper rail member (2) may be locked at a normal withdrawn position shown in FIG. 2 relative to the lower rail member (1).

In the lower end portion of upper rail member (2), there is provided a guide roller arrangement, as previously noted, which functions to protect the locking mechanism (at 26), against malfunction due to the previously stated pulling force (P) applied thereto, while supporting the forwardly advanced portion of the upper rail member (2) exposed from the lower rail member (1) (see FIG. 3), and further facilitate the ease with which the upper rail member (2) may be slidingly projected from and withdrawn into the lower rail member (1). As shown, such guide roller arrangement is embodied by simply arranging a pair of forward guide rollers (28C), a pair of intermediate guide rollers (28B) and a pair of rearward guide rollers (28A) at the lower end portion of upper rail member (21) in the longitudinal direction thereof, and further arranging a pair of triangular guide pieces (27) at the pair of forward guide rollers (28C). It is observed that those three pairs of guide rollers (28A)(28B) (28C) are generally disposed in a mutually equidistant fashion, and in particular, the forward guide rollers (28C) are disposed relatively far inwardly of the upper rail member (2) or relatively remote from the forward end of upper rail member (2), as compared with ordinary known guide roller arrangement in this sort of slide rail device. This is intended to lengthen as long as possible the distance in which the forward guide rollers (28C) have to roll in the lower rail member (2) for giving the longest possible guide and support assistance to the upper rail member (2) in cooperation with the intermediate and rearward guide rollers (28B) (28A).

The pair of forward guide rollers (28C) are shown to be disposed generally at the forward widened area (22) of upper rail member (2), projecting from both lateral sides of the latter. As best shown in FIG. 5 in conjunction with FIG. 1, the two forward guide rollers (28C) are rotatably supported on a pin (27A) which penetrates through the lower end portion of upper rail member (2) such as to project from the opposite sides of upper rail member (2). Further, a pair of triangular guide pieces (27) are each integrally fixed on the respective ends of pin (27A). In such normal locked position as in FIG. 2 where the upper rail member (2) is locked by the locking mechanism (26, 16A), with the whole length of its body being set in alignment with that of the lower rail member (1), the two guide rollers (28C), together with the triangular guide pieces (27), are rollably accommodated respectively in a pair of longitudinal guide passages, previously stated, each being defined by the bottom, lateral and top walls (1A)(1B)(1C) as well as the downwardly expending guide flange (1D) associated with the lower rail member (1). The triangular guide piece (27) is best shown in FIG. 2 to have a tapered horizontal end area (27E) which orients toward and along the longitudinal direction of lower rail member (1) for a purpose to be set forth later.

On the other hand, the pair of rearward guide rollers (28C) are shown to be disposed at the rearward widen area (23) of upper rail member (2), projecting from both lateral sides of the latter as similar to the foregoing forward guide rollers (28C). As understandable from FIG. 6, these rearward guide rollers (28A) are rotatably supported on a pin (29) penetrating through the lower end portion of upper rail member (2) and projecting from the opposite sides of upper rail member (2).

The pair of intermediate guide rollers (28B) are located at a narrowed area (20) of upper rail member (2) in such a manner that the intermediate guide rollers (28B) themselves and the rearward guide rollers (28A) are disposed symmetrically relative to and on the opposite sides of the lock plate (26). Likewise as in the rearward guide rollers (28A) and as seen from FIG. 6, the intermediate guide rollers (28B) are rotatably supported on its own pin (29) of the same kind with the foregoing pin (29) associated with the rearward guide rollers (28C).

In contrast to an ordinary known guide roller arrangement, a distance is relatively shortened between the intermediate and rearward guide rollers (28B)(28A) with a view to protecting the lock plate (26) against damage or deformation when the pulling force (P) is applied thereto. It is important here that the intermediate and rearward guide rollers (28B)(28A) should be so spaced from each other relative to the lock plate (26) as to stably support the whole body of seat (S), considering the fact that the rearward end area of seat (S), mainly supported by those guide rollers (28B)(28A), weighs a large amount relative to the forward end area of same seat (S) by the reason that the total weight of seat back (SB), connecting bracket or reclining device (not shown) and seat belt anchor (33) is intensively applied to that particular rearward end area of seat (S). It is also important that all the guide rollers (28A, 28B, 28C) should have a diameter slightly smaller than the height of the guide passage of lower rail member (1), as can be seen from FIGS. 5 and 6. These guide roller arrangements insure to keep the whole upper rail member (2) in a normal parallel or smooth slidable relation with the lower rail member (1), hence avoiding a wobbling of the upper rail member (2) and also preventing contact of the forward half of upper rail member (2) with the bottom wall of lower rail member (1) when the upper rail member (2) is slid forwardly to the degree at which the forward guide rollers (28C) are disengaged externally from the lower rail member (1) as in FIG. 3.

In accordance with the present invention, as earlier stated, there is provided a separation preventive means for preventing the upper rail member (2) against separation from the lower rail member (1). As illustrated, this separation preventive means is embodied by the foregoing hook-like lock member (31), a U-shaped first striker (21), a notch (24), a U-shaped second striker (4) and a generally U-shaped stopper (25).

The first striker (21) is fixed on the rearward widened area (23) of upper rail member (2), projecting its U-shaped body from the planar outward wall of the latter to assume a generally inverted "C" fashion therefrom. As best shown in FIG. 2, this first striker (21) is located at a point right above-the rearward guide roller (28A), defining its closed space for receipt of the free hook end portion (31Ea) of lock member (31). In this respect, it is noted that nothing but such lock member (31) supports the rearward end part of seat (S) and rests on the first striker (21), and therefore, both those two elements are rigid enough to resist a downward load from the weight of seat (S) and occupant thereon. With this arrangement, in particular, a vertical upward component force (Pa) of great pulling force (P) will be escaped or imparted to the floor (F) through the lock member (31), first striker (21), rearward guide rollers (28A), lower rail member (1) and rearward leg member (11). Further, the engagement of lock member (31) with the first striker (21) serves to resist a forward horizontal component force (Pb) in cooperation with the engagement of lock plate (26) with the lock holes (16A).

The notch (24) is formed in the rearmost end of the upper rail member (2), directing its elongated opening on a horizontal line.

The second striker (4) is fixed in an inverted "U" fashion upon the sloped transition region (41S) between the upper flat stage (41) and intermediate stepped section (40) of floor (F). As shown, the second striker (4) erects perpendicularly in respect to the horizontal line of floor (F), offering its upper horizontal section (4a) at the same level with the foregoing notch (24), so that, when the upper rail member (2) is locked at the home position on the lower rail member (2) as in FIG. 2, the notch (24) is engaged over the upper horizontal section (4a) of second striker (4). Namely, under this condition, such engagement between the notch (24) and second striker (4) effectively disperses the vertical upward component force (Pa) to the floor (F), thereby avoiding an intensive exertion of the pulling force (P) on the rearward end of upper rail member (2) and thus preventing deformation of the same.

The stopper (25) is fixed on the foremost end part of upper rail member (2) in a manner dependent therefrom, such that the stopper (25) is abutted against the foremost ends (1F) of lower rail member (1) and the forward leg member (12) when the upper rail member (2) is set at the home position on the lower ail member (1), as shown in FIG. 2. Hence, the upper rail member (2) is limited by that stopper (25) against further backward sliding movement on the lower rail member (1). In addition thereto, the stopper (25) serves to escape or disperse a portion of the upward slant pulling force (P) via the forward leg member (12) to the floor (F).

With the slide rail device (SLD) constructed above, under the normal state shown in FIG. 2, the three lock teeth (16A) of lock plate (26) are engaged in the respective three rearward lock holes (16A), while the lock plate (31) and notch (24) are respectively engaged with the first and second strikers (21)(4). Moreover, the stopper (25) is abutted against the foremost end (1F) of lower rail member (1). Accordingly, in addition to being locked by the lock plate (26), the upper rail member (2) or the seat (S) is also locked by such elements of separation preventive means against fore-and-aft movement with respect to the lower rail member (1). In a collision case or the like, dynamically stated, an upwardly slant great pulling force (P) is generated from the occupant sitting on the seat (S) and transmitted via both seat belt (B) and seat belt anchor (33) to the hook-like lock member (31). Then, an upward vertical component force (Pa) of the force (P) is dispersed to one transmission path established by the first striker (21), rearward guide rollers (28A) and rearward leg member (11), and to another transmission path established by the notch (24) and second striker (4). In that way, such component force (Pa) is dispersed and transmitted to the floor (F), whereby both rearward guide rollers (28A) and rearward end portion of upper rail member (2) are protected from damage and deformation. The forward horizontal component force (Pb) is dispersed to the upper and lower rail members (2)(1) via the engagement between the lock member (31) and first striker (21) as well as the engagement between the three lock teeth and holes (26E)(16A). Furthermore, most of the upwardly slant pulling force (P) is directly transmitted to the stopper (25) and escaped therethrough to the floor (F), because the stopper (25) is abutted against both forward leg member (12) and vertical foremost end (1F) of lower rail member (1), thus providing a main interference with the upwardly slant exertion of force (P) to turn up and separate the rearward end portion of upper rail member (2) from the lower rail member (1) relative to the forward end (at 1F) of slide rail device. Thus, the upwardly slant pulling force (P) is effectively dispersed to the floor (F) through the stopper (25), lower rail member (1) and forward leg member (12).

In FIG. 2, the hook-like lock member (31) may be rotated anticlockwise against the biasing force of spring (31S) to release itself out of engagement with the first striker (21), as indicated by the arrow. A user can directly grasp that lock member (31) with his or her fingers for such rotative unlock purpose, or alternatively, though not shown, a control device or simply a strap may be operatively connected to the lock member (31) for remote rotative unlocking and locking operation. Once this lock member (31) is released from engagement with the first striker (21), the seat (S), with the seat back (SB) folded onto the seat cushion (SC), can be jumped or turned forwardly about the hinge (22B) to the inverted upright position indicated by the two-dot chain line and arrow in FIG. 2. This provides an increased space on the floor (F) within the cabin to permit its use as a load carrying area.

FIG. 3 shows the state where the upper rail member (2) or the seat (S) has been moved forwards along the lower rail member (1) and locked at the predetermined advanced lock position thereon, with the three lock teeth (26E) of lock plate (26) engaged in the forward set of three lock holes (16B), respectively. It is to be understood from FIGS. 2 and 3 that, upon the lock plate (26) raised out of engagement with the rearward set of three lock holes (16A) in the home position shown in FIG. 2, the upper rail member (2) or the seat (S) may be slid forwardly along the lower rail member (1), and that, as can be seen from FIG. 3, while the forward guide rollers (28C) are removed from the guide passage of lower rail member (1) during the forward sliding of upper rail member (2), the intermediate and rearward guide rollers (28B)(28A) are still rolled within the guide passage of lower rail member (1), which effectively retains the externally projected forward half of upper rail member (1) against contact with the bottom wall (1A) of lower rail member (1), as explained previously. Then, as shown in FIG. 3, the lock plate (26) is lowered to engagement with the forward set of three lock holes (16B) to lock the upper rail member (2) or seat (S) at the predetermined advanced position. Even in this instance, both intermediate and rearward guide rollers (28B)(28A) remain placed in the lower rail member (1), serving to support and retain the projected forward half of upper rail member (2) in a parallel relation with the longitudinal plane of the lower rail member bottom wall (1A). Thus, the projected forward half of upper rail member (2) can be withdrawn smoothly into the lower rail member (1) without any contact with the bottom wall (1A) of the latter.

Under the state shown in FIG. 3, likewise as in FIG. 2, the lock member (31) may be rotated clockwise against the biasing force of spring (31S) to release it from engagement with the first striker (21), so that the seat (S), with the seat back (SB) folded onto the seat cushion (SC), can be jumped or turned forwardly about the hinge (22B) to the inverted upright position indicated by the two-dot chain line and arrow in FIG. 3. This will provide a further increased space on the floor (F) for use as a much wider load carrying area.

As seen in FIGS. 4 and 5 in conjunction with FIG. 3, when sliding back the projected forward half of upper rail member (2) into the lower rail member (1), the two forward guide rollers (28C) are smoothly slid, with the guiding aid of two triangular guide pieces (27), into the two respective two longitudinal guide passages of lower rail member (1). That is, as each horizontally extending tapered end area (27E) of two guide pieces (27) orients towards the respective two longitudinal guide passages of lower rail member (1), both two forward guide rollers (28C) are precisely brought and introduced into the two respective longitudinal guide passages of lower rail member (1). In other words, it is possible that a difference may occur in level between the forward guide roller (28C) and lower rail member (1) due to an unexpected downward inclination of the projected forward half of upper rail member (2) or a wobbling of the upper rail member (2) per se relative to the lower rail member (1), which will hinder entry of the guide roller (28C) into the guide passage of the latter (1). In that case, smooth sliding introduction of guide piece tapered end area (27E) into the guide passage of lower rail member (1) helps to compensate such level difference between the guide roller (28C) and lower rail member (1) and guides that particular roller (28C) precisely into the guide passage of lower rail member (1). This insures that the whole projected forward half of upper rail member (1) is completely slid back into the lower rail member (1) as shown in FIG. 2.

Accordingly, it is appreciated that the structurally simplified slide rail device (SLD) of the present invention has the following various advantages and effects:

(I) The separation preventive means in the present invention comprises the hook-like lock member (31), notch (24), strikers (4)(21) and stopper (25), which are all easily and directly applicable to a conventional known structure of slide rail (1, 2), without any changes and substantive increase of weight. For, those elements are of relatively small materials separate from the slide rail, only except that the notch (24) is formed therein, and therefore, they can be directly attached to the seat (S), slide rail (1, 2) and floor (F). This eliminates the need for any particular reinforcing formation of the upper and lower rail members (2)(1) that increases their whole weights, such as by increasing their thicknesses as found in the prior art. In particular, the strikers (4)(5) and stopper (25) can be formed substantially in the same "U" shape from the same material, which simplifies the structure and lowers costs. As described earlier, those separation preventive elements effectively present an optimal force escaping system to escape and disperse the great upward pulling force (P), in its component force vectors, down to the floor (F), thereby providing a large strength to completely prevent separation of the upper rail member (2) from the lower rail member (1).

(II) The present invention is particularly effective for use in the relatively short slide rail provided in the second seat having the seat belt anchor within the one-box or ban-type automobile, since, in general, the strength of slide rail of this sort is insufficient for preventing the separation of upper rail member (2) from the lower rail member (1).

(III) The guide roller arrangement (27, 28A, 28B, 28C) is such that the intermediate and rearward guide rollers (28B) (28A) are disposed on the opposite sides of the lock plate (26) and spaced from each other to the narrowest possible degree such as to support the seat (S) stable with respect to the lower rail member (1) or the floor (F). Hence, not only the lock plate (26) is sufficiently protected by the two guide rollers (28B)(28A) against the pulling force (P), but also the forward portion of upper rail member (2) can be projected as long as possible from the lower rail member (1). The triangular guide pieces (27) serve to insure smooth sliding back of the upper rail member (2) into the lower rail member (1).

In view of the (I), (II) and (III) above, in accordance with the present invention, the upper rail member (2) is not merely protected against damages and deformation, but provided with a smooth slidability in and along the lower rail member (1), with much simplified and lightweight structure.

While having described the present invention thus far, it should be finally understood that the invention is not limited to the illustrated embodiments, but any other modifications, replacements and additions may be structurally applied thereto without departing from the scopes of the appended claims.

What is claimed is:

1. In combination with a seat for a vehicle and a floor of the vehicle, wherein the seat includes a seat cushion and a seat back, a slide rail device comprising:

a lower rail means to be fixed on said floor of the vehicle;

an upper rail means slidably fitted in and along said lower rail means, on which said upper rail means said seat cushion of the seat is to be mounted, said upper rail means being slidable on said lower rail means between a home position where said upper rail means is normally placed relative to said lower rail means and an advanced position where the upper rail means is slid in a direction away from the lower rail means;

a separation preventive means for preventing said upper rail means against separation from said lower rail means, said separation preventive means including:

a first striker means projecting from said floor of vehicle;

a notch means defined on a first end portion of said upper rail means, said notch means being adapted for engagement with said first striker means when the upper rail means is located at said home position; and a stopper means provided on a second end portion of said upper rail means opposite to said first end portion of the upper rail means, wherein, the stopper means is to be abutted against a first end portion of said lower rail means and a side of said floor of the vehicle, when said upper rail means is located at said home position.

2. The slide rail device as defined in claim 1, wherein said separation means further comprises a second striker means provided on said upper rail means adjacent to said notch means, and a hook-like engagement means fixed on the seat cushion to be engageable with said second striker means.

3. The slide rail device as defined in claim 1, wherein said seat cushion of the seat is connected via a hinge means with said upper rail member to permit jumping of the vehicle seat relative to said hinge means from the upper rail member to an inverted upright position, and wherein said separation means further comprises second striker means provided on said upper rail means adjacent to said notch means and a hook-like engagement means fixed on the seat cushion to be engageable with said second striker means, so that when the hook-like engagement means is engaged with the second striker means, the upper rail means is not only prevented against separation from the lower rail means, but also locked against said jumping of the seat.

4. The slide rail device as defined in claim 1, wherein said first striker means and stopper means are both of a generally "U" shape.

5. The slide rail device according to claim 3, wherein said hook-like engagement means comprises a hook-like engagement member rotatably provided on said seat cushion and a biasing means for normally biasing the hook-like engagement means in a direction for engagement with said second striker means at said upper rail means.

6. The slide rail device according to claim 5, wherein said second striker means is of a generally "U" shape.

7. The slide rail device as defined in claim 1, wherein said lower rail means is fixed via a leg means to said floor of the vehicle, wherein said stopper means is abutted against said one end portion of said lower rail means and said leg means when said upper rail means is located at said home position.

8. The slide rail device as defined in claim 1, wherein said upper and lower rail means are generally equal in length to each other.

9. In combination with a seat for a vehicle and a floor of the vehicle, wherein the seat includes a seat cushion and a seat back, a slide rail device comprising:

a lower rail means to be fixed on said floor of the vehicle;

an upper rail means slidable fitted in and along said lower rail means, on which said upper rail means, said seat cushion of the vehicle seat is to be mounted, said upper rail means being slidable on said lower rail means between a home position where said upper rail means is normally placed relative to said lower rail means and an advanced position where the upper rail means is slid in a direction away from the lower rail means and located, with a first region of the upper rail means projecting externally therefrom;

said upper and lower rail means being generally equal in length to each other;

a guide roller arrangement which is so provided at said upper rail means as to be rollable within said lower rail means for supportive guiding of sliding movement of said upper rail means along the lower rail means, said guide roller arrangement including:

a first guide roller means disposed on said first region of the upper rail means;

a second guide roller means disposed on a second region of the upper rail means opposite to said first region of the upper rail means; and an intermediate guide roller means generally disposed midway on the upper rail means between said first and second guide roller means; and a separation preventive means for preventing the upper rail means against separation from the lower rail means, said separation preventive means including:

a first striker means protecting from said floor of the vehicle;

a notch means defined on an end of said second region of the upper rail means, said notch means being adapted for engagement with said first striker means when the upper rail means is located in said home position; and a stopper means provided at an end of said first region of the upper rail means, wherein, the stopper means is to be abutted against an end of said lower rail means and a side of said floor of the vehicle when the upper rail means is located at said home position.

10. The slide rail device as defined in claim 9, wherein said separation means further comprises a second striker means provided on said upper rail means adjacent to said notch means, and a hook-like engagement means fixed on said seat cushion of the seat such as to be engageable with said second striker means.

11. The slide rail device as defined in claim 9, wherein said guide roller arrangement further comprises a guide piece fixed to a pin on which said first guide roller means is rotatably supported, said guide piece shaped to have a tapered end area oriented in a direction inwardly of said lower rail means so that under a condition where said first region of the first guide roller means is exposed externally of the lower rail means at said advanced position, and when the upper rail is withdrawn from the advanced position towards said home position, said tapered end area of the guide piece is smoothly introduced into the lower rail means, thereby assisting in smooth entry of the first guide roller means into the lower rail means.

12. The slide rail device as defined in claim 9, wherein said second and intermediate guide roller means are distant from each other to a smallest possible degree so as to support and keep said first region of the upper rail means out of contact with said lower rail means when the upper rail means is located at said advanced position, with said first region thereof and said first guide roller means being both exposed externally of the lower rail means.

13. The slide rail device as defined in claim 9, wherein said separation means further comprises a second striker means provided at said upper rail means adjacent to said notch means, and a hook-like engagement means fixed on the seat cushion to be engageable with said second striker means, and wherein said second guide roller means is situated right below said second striker means.

14. The slide rail device as defined in claim 9, wherein a lock mechanism is provided between said upper and lower rail means for locking and unlocking the upper rail means to and from the lower rail means, and wherein a part of said lock mechanism is disposed at a point of the upper rail means between said intermediate and second guide roller means.

15. The slide rail device according to claim 14, wherein said part of the lock mechanism comprises a lock plate means movable in said upper rail means, wherein said lock mechanism includes a lock hole means defined in said lower rail means, and wherein said lock plate means may be moved for engagement with and disengagement from said lock hole means in order to lock and unlock the upper rail means relative to the lower rail means.

16. In combination with a seat of a vehicle and a floor of the vehicle, wherein the seat includes a seat cushion, a seat back and a seat belt anchor provided on the seat cushion, a slide rail device comprising:

a lower rail means to be fixed on said floor of vehicle;

an upper rail means slidably fitted in and along said lower rail means, on which said upper rail means said seat cushion of the seat is to be mounted, said upper rail means being slidable on said lower rail means between a home position where said upper rail means is normally placed relative to said lower rail means and an advanced position where the upper rail means is slid in a direction away from the lower rail means and located with a first region of the upper rail means projecting externally therefrom;

said upper and lower rail means being generally equal in length to each other;

a guide roller arrangement which is so provided at said upper rail means as to be rollable within said lower rail means for supportive guiding of sliding movement of said upper rail means along the lower rail means, said guide roller arrangement including:

a first guide roller means disposed on said first region of the upper rail means;

a second guide roller means disposed on a second region of the upper rail means opposite to said first region of the same upper rail means; and an intermediate guide roller means generally disposed midway on the upper rail means between said first and second guide roller means; and a separation preventive means for preventing the upper rail means against separation from the lower rail means, said separation preventive means including:

one first striker means projecting from said floor of the vehicle;

a notch means defined on an end of said second region of the upper rail means, said notch means being adapted for engagement with said first striker means when the upper rail means in located in said home position;

a stopper means provided at an end of said first region of the upper rail means, wherein, the stopper means is to be abutted against an end of said lower rail means and a side of said floor of the vehicle when the upper rail means is located at said home position;

a second striker means provided on said upper rail means adjacent to said notch means; and a hook-like engagement means fixed on said seat cushion of the seat to be engageable with said second striker means; and said seat belt anchor being disposed adjacent to said notch means.

17. The slide rail device as defined in claim 16, wherein said lower rail means is fixed via a leg means to said floor of vehicle, wherein said stopper means is abutted against said first end portion of said lower rail means and said leg means when said upper rail means is located at said home position.

18. The slide rail device as defined in claim 14, wherein said first striker means, said second striker means, and said stopper means are all of a generally "U" shape.

* * * * *